Aug. 5, 1969  L. N. LIEBERMANN ET AL  3,460,125
METHOD AND APPARATUS FOR DETECTING GASEOUS IMPURITIES
Filed May 5, 1967  4 Sheets-Sheet 1
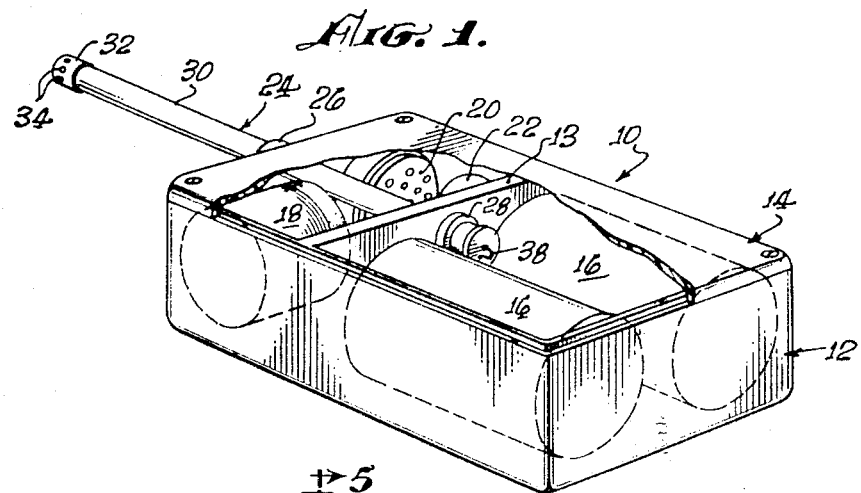
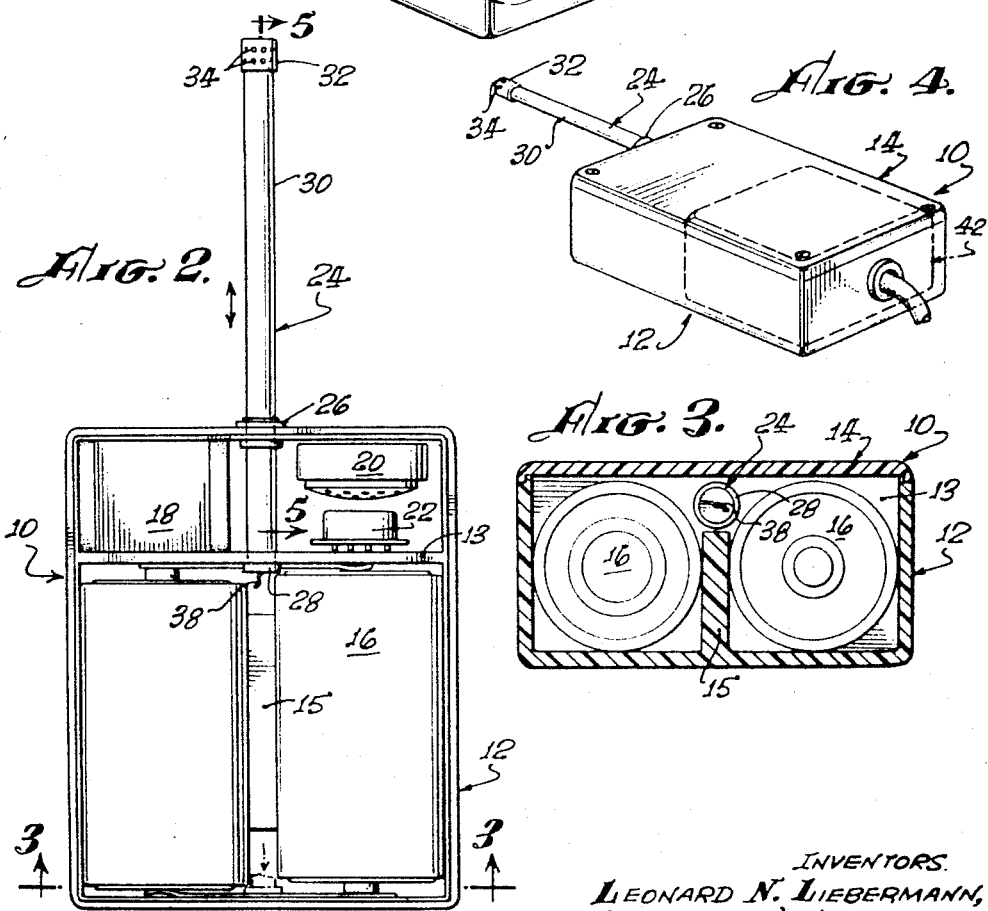
INVENTORS.
LEONARD N. LIEBERMANN,
STANLEY H. LAI,

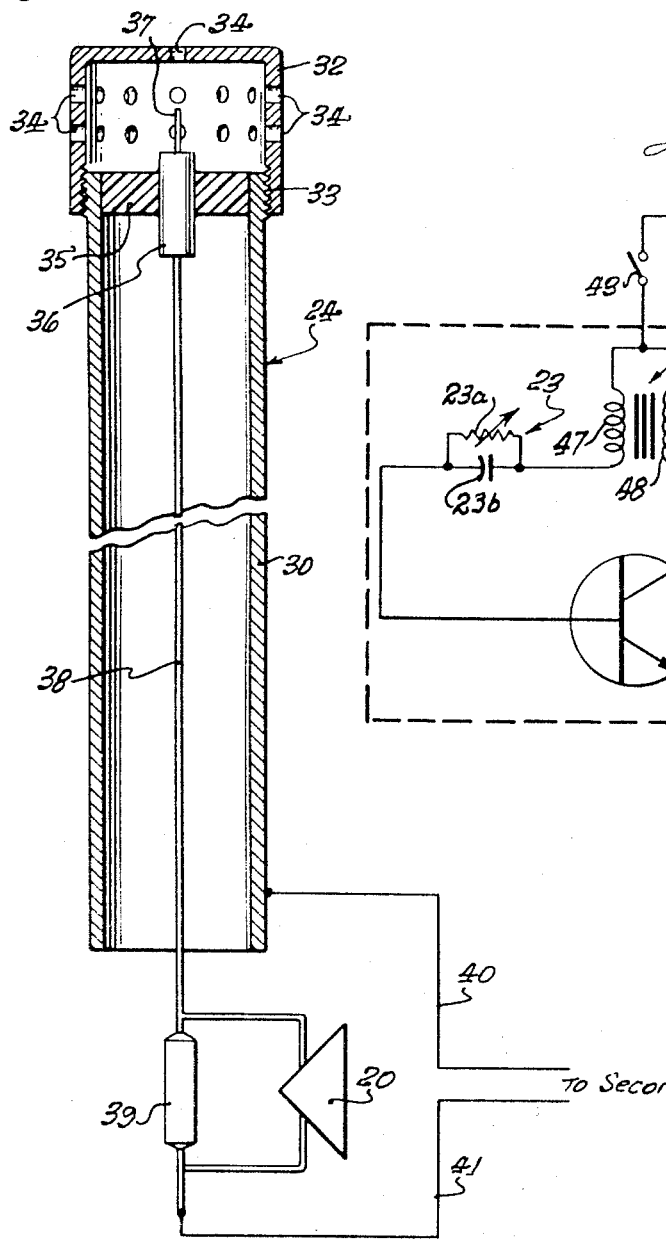
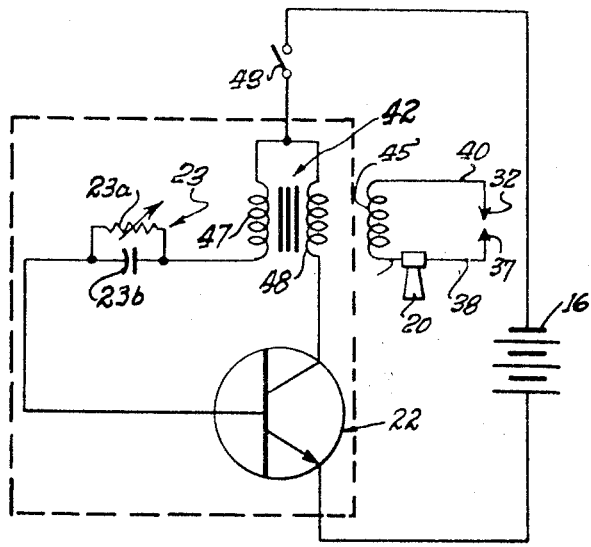

INVENTORS
LEONARD N. LIEBERMANN
STANLEY H. LAI

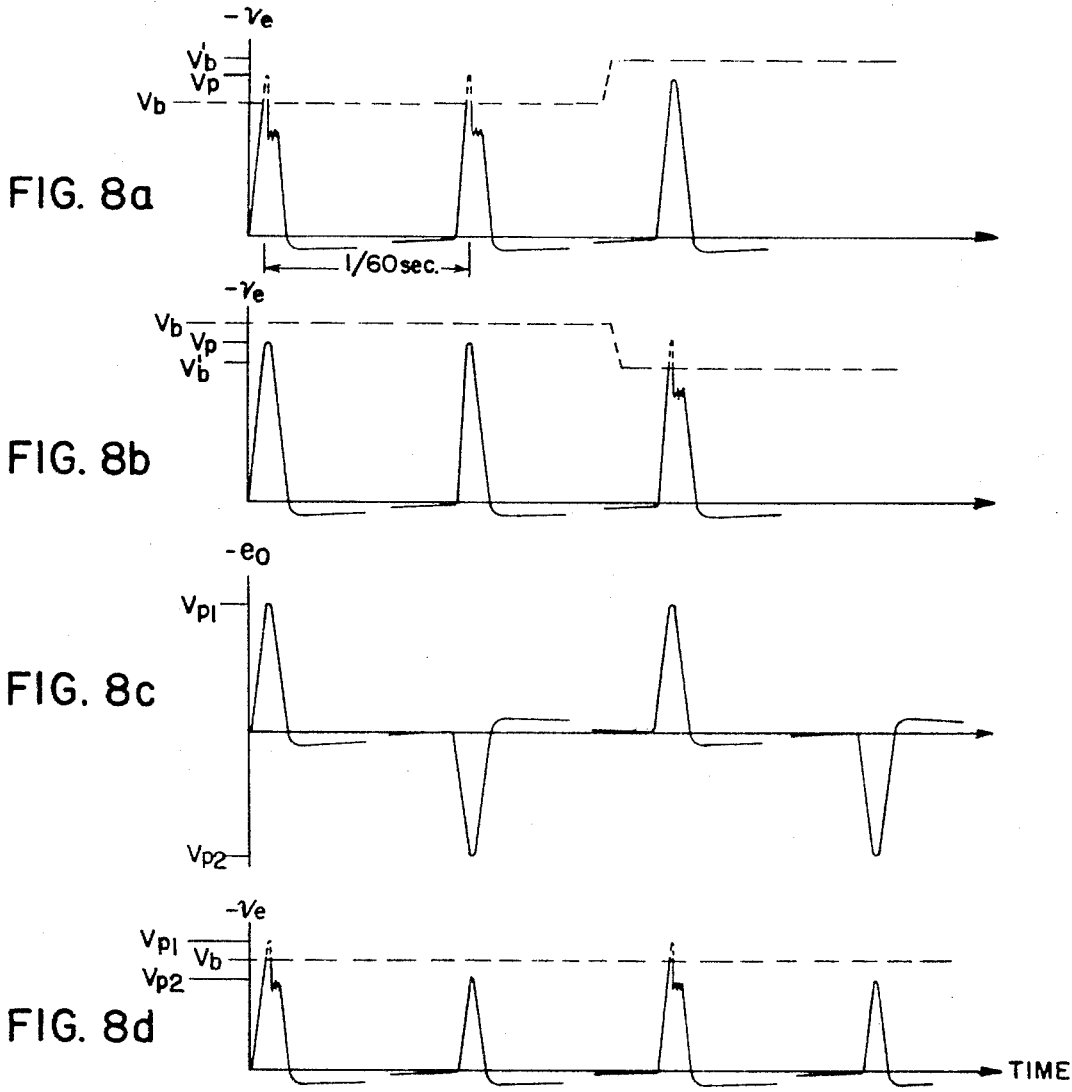
FIG. 8a
FIG. 8b
FIG. 8c
FIG. 8d
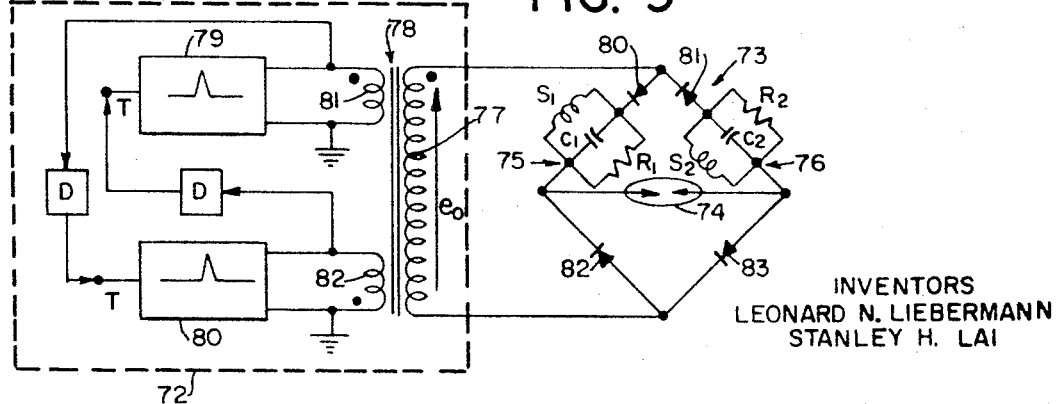
FIG. 9
INVENTORS
LEONARD N. LIEBERMANN
STANLEY H. LAI United States Patent Office 3,460,125
Patented Aug. 5, 1969

3,460,125
METHOD AND APPARATUS FOR DETECTING GASEOUS IMPURITIES
Leonard N. Liebermann, La Jolla, and Stanley H. Lai, San Diego, Calif., assignors to Thermal Industries of Florida, Inc., a corporation of Delaware
Continuation-in-part of application Ser. No. 417,385, Dec. 10, 1964. This application May 5, 1967, Ser. No. 636,352
Int. Cl. G08b 21/00
U.S. Cl. 340—242                      22 Claims

ABSTRACT OF THE DISCLOSURE

A low intensity spark discharge is periodically ignited and extinguished in a given atmosphere by applying a voltage across two electrodes which differs slightly in amplitude from the dielectric breakdown potential $V_b$ of the given atmosphere. To detect impurities which have the effect of raising the dielectric breakdown potential $V_b$ of the given atmosphere, apparatus is provided for applying a periodic electrode voltage greater in amplitude than $V_b$, and cessation of the resultant spark discharge is detected by a device which signals the presence of the impurity. To detect impurities which have the effect of lowering the dielectric breakdown potential $V_b$ of the given atmosphere, the applied periodic electrode voltage is made lower in amplitude than $V_b$, and apparatus is provided for detecting initiation of a spark discharge corresponding to the applied voltage and for signaling the presence of the impurity denoted thereby. In one embodiment, at least one electrode is composed essentially of zirconium, virtually eliminating electrode fouling and concomitant misfiring.

CROSS-REFERENCE

This is a continuation-in-part of application Ser. No. 417,385, filed Dec. 10, 1964, now abandoned.

BACKGROUND OF THE INVENTION

Field of the invention

This invention relates generally to a method and apparatus for electrically detecting the presence of gaseous impurities in a given atmosphere. Although applicable to the detection of any gaseous impurity (or substance which behaves like a gaseous impurity) having a dielectric breakdown potential materially different from that of the given test atmosphere, the invention is particularly useful for detecting leaks of refrigerant compounds from refrigeration equipment or other machinery utilizing halogen compounds for heat transfer or absorption. Particularly because the halogen compounds used in such equipment are sometimes toxic, any such detector should be highly reliable and capable of detecting even minute traces of halogens. A halogen is defined herein as any compound having at least one halogen atom and which is capable of existing in the gaseous phase.

Description of the prior art

Normally, the halogen gas is detected by various types of apparatus which utilize chemically produced flames, or more simply by measuring any drop in pressure in a system in which it is desired to detect halogen leakage. The latter method is quite insensitive and is practical only for the detection of large leaks.

The former method is carried out generally using a burner, a copper plate reactor and an exploring hose. The burner is supplied with acetylene gas or pressurized alcohol to produce a flame, which heats the copper plate to incandescence. Atmosphere suspected of containing halogen vapor is drawn by injector action through the exploring hose into the burner, where it passes over the heated copper reactor plate. If there is a trace of halogen vapor present, the color of the burner flame will change from blue to green as the halogen vapor comes in contact with the copper plate. While this method is quite effective, it requires considerable apparatus and is hazardous to use due to the presence of an open flame in a potentially combustible atmosphere. A method for electrically detecting halogen vapor is known in which the vapor is conducted into the vicinity of a high intensity electrical spark or arc across two electrodes, at least one of which is copper. The copper electrode is heated by the discharge and acts similarly to the copper reactor plate in the above-mentioned device, detection being evidenced by a color change. This apparatus is also cumbersome, and the high temperature arc is even more hazardous than the burner flame.

A further known method of halogen detection is to generate a sustained electric discharge, or arc, between two electrodes and to monitor the current through or the voltage across the electrodes. Because the discharge impedance (herein defined as the ratio of applied electrode voltage to discharge current during spark discharge) of a gas mixture depends upon its composition, the presence of gaseous impurities is detectable by noting changes in the discharge impedance.

Detection of impurities by this technique may be carried out using either direct current or alternating current to sustain the discharge. Under either condition, gas atoms sustaining the discharge remain continuously ionized, because (1) in the D.C. case, ionizing potential is always present, and (2) the high levels of alternating current heretofore proposed have produced discharges at energy levels too high to permit extinguishment of the arc, and dissipation of electron clouds in the region of the discharge, between cycles of the current waveform. In addition, the high current levels produced electrode heating, with consequent thermionic ionization persisting between cycles.

Detectors which measure changes in discharge current or the voltage associated therewith are usually relatively insensitive, because discharge current itself is not highly sensitive to changes in gas composition, and such detectors have tended to be cumbersome and complex to use. Moreover, they have suffered from deterioration or contamination of the electrodes supporting the discharge, which causes changes in the discharge impedance and, consequently, erroneous detection.

SUMMARY OF THE INVENTION

This invention provides a method and apparatus for detecting the presence in a given atmosphere of gaseous impurities having dielectric breakdown potentials different from that of the given atmosphere. Apparatus is provided for periodically applying voltage pulses across a pair of electrodes disposed in the given atmosphere, which voltage pulses have peak amplitudes slightly different from the dielectric breakdown potential $V_b$ of the given atmosphere. The presence of a low intensity spark discharge between the pair of electrodes is detected by a detector, which initiates a signal indicative thereof. By this means changes in the dielectric breakdown potential of the given atmosphere, due to the presence of such gaseous impurities, are detected by the failure to ignite, or the ignition of, a low intensity spark discharge corresponding to each of the applied voltage pulses.

In particular, it has been found that gaseous impurities having dielectric breakdown potentials greater than that of the given atmosphere to be tested can be detected with extreme sensitivity, by periodically igniting and extinguishing a low intensity spark discharge between two electrodes in the given atmosphere, and detecting the cessation of the periodic discharge caused by elevation of $V_b$ by the presence of the gaseous impurity. Note that while the "cessation" of the periodic discharge is referred to, from the point of view of each applied voltage pulse the discharge does not cease, but actually fails to ignite.

The dielectric breakdown potential $V_b$ of a gas, as used herein, is that potential applied between two electrodes disposed in the gas at which spark breakdown occurs.

Because there has been in the past a great deal of confusion and misunderstanding regarding the various mechanisms occurring in gas discharges and the several thresholds observed in such discharges, and because such misunderstanding has led to confusion in the nomenclature used to describe such discharges, reference is made for definitional purposes to a relevant and compresensive work by Leonard B. Loeb entitled "Electrical Coronas, Their Basic Physical Mechanisms." Loeb describes such various thresholds and breakdown characteristics as follows, at page 5:

"Except at relatively low pressures, the luminous manifestations at the highly stressed electrode [in a nonuniform field] near the threshold for the low currents take on various characteristic shapes, such as flows, multiple spots, haloes, coronas, brushes, streamers, etc. In consequence, these luminous manifestations give to the phenomena the general name coronas. * * * This expression, corona, will be used to describe the general class of luminous phenomena appearing associated with the current jump to some microamperes at the highly stressed electrode preceding the ultimate spark breakdown of the gap. Where observed, the sudden current jump, usually just preceding the initial appearance of the corona and the associated value of the potential, will be designated as the corona threshold. The threshold for the appearance of a corona form may be further classified in terms of the characteristic phenomenon or mechanisms associated with it, such as the burst pulse threshold, the streamer threshold, the Trichel pulse threshold, or the glow discharge threshold. The current at many such thresholds is pulsating or intermittent in nature. Depending on the geometry and the spectroscopic nature of the gas, the intermittent or pulsed thresholds may not show luminosity in all cases. If the potential is raised on the order of some hundreds of volts above threshold, the frequencies of the intermittent pulses become so great that they merge to a nearly steady but slightly fluctuating current. Transition from intermittent to the steady state is sometimes sharp and is described as the onset of steady corona. Above the onset of steady corona there will be a limited region, in which current increases nearly proportional to potential increase. This is called the Ohm's law regime. After this the current increases more rapidly than potential, that is, parabolically, eventually leading to a complete spark breakdown, which will be so designated."

It is particularly important to distinguish between the corona discharge and spark breakdown. It has been shown (Mohr and Weissler, Physical Review, vol. 72, No. 4, Aug. 15, 1947, pp. 294–297) that the onset of corona discharge in air, unlike spark breakdown, is unaffected by the presence of halogens. Thus the corona discharge is not used in this invention. The discharge utilized is a "low intensity" spark discharge, defined as a spark discharge which is not so intense (i.e. produced by such a high current level) as not to be extinguished, and space charges in the vicinity of the discharge dissipated, between successive voltage pulses. In the particular devices described herein, the peak spark discharge current is on the order of a few tenths of a milliampere, and generally will be less than about 0.5 milliampere.

The breakdown potential of a gas and its discharge impedance (defined above) are two distinct and totally unrelated properties, which pertain in the gas under mutually exclusive conditions. Further, once spark breakdown has occurred and ionization current has begun to flow, lowering the applied voltage below the breakdown point will not extinguish the discharge until a substantially lower voltage is reached.

A particularly advantageous embodiment of the present invention employs at least one electrode consisting essentially of zirconium, virtually eliminating the problem of electrode fouling inherent in previous discharge devices.

One especially convenient form of the invention utilizes the rectifying property of the spark discharge for deriving a signal indicative of the existence of the discharge.

BRIEF DESCRIPTION OF THE DRAWINGS

The invention will be described in conjunction with the accompanying drawings, in which:

FIG. 1 is a diagrammatic view in perspective of one embodiment of the invention;

FIG. 2 is a plan view of the embodiment of FIG. 1, with the top cover removed;

FIG. 3 is an end elevation taken on the line 3—3 of FIG. 2;

FIG. 4 is a diagrammatic perspective view of another embodiment of the invention;

FIG. 5 is a plan view partly in cross section showing certain aspects of the invention;

FIG. 6 is a circuit diagram of the embodiment of the invention shown in FIGS. 1, 2 and 3;

FIGS. 8a–d are graphs of various waveforms occurring in the above-mentioned devices; and FIG. 9 is a circuit diagram of another embodiment of the invention.

DESCRIPTION OF THE PREFERRED EMBODIMENTS

Figure 7:
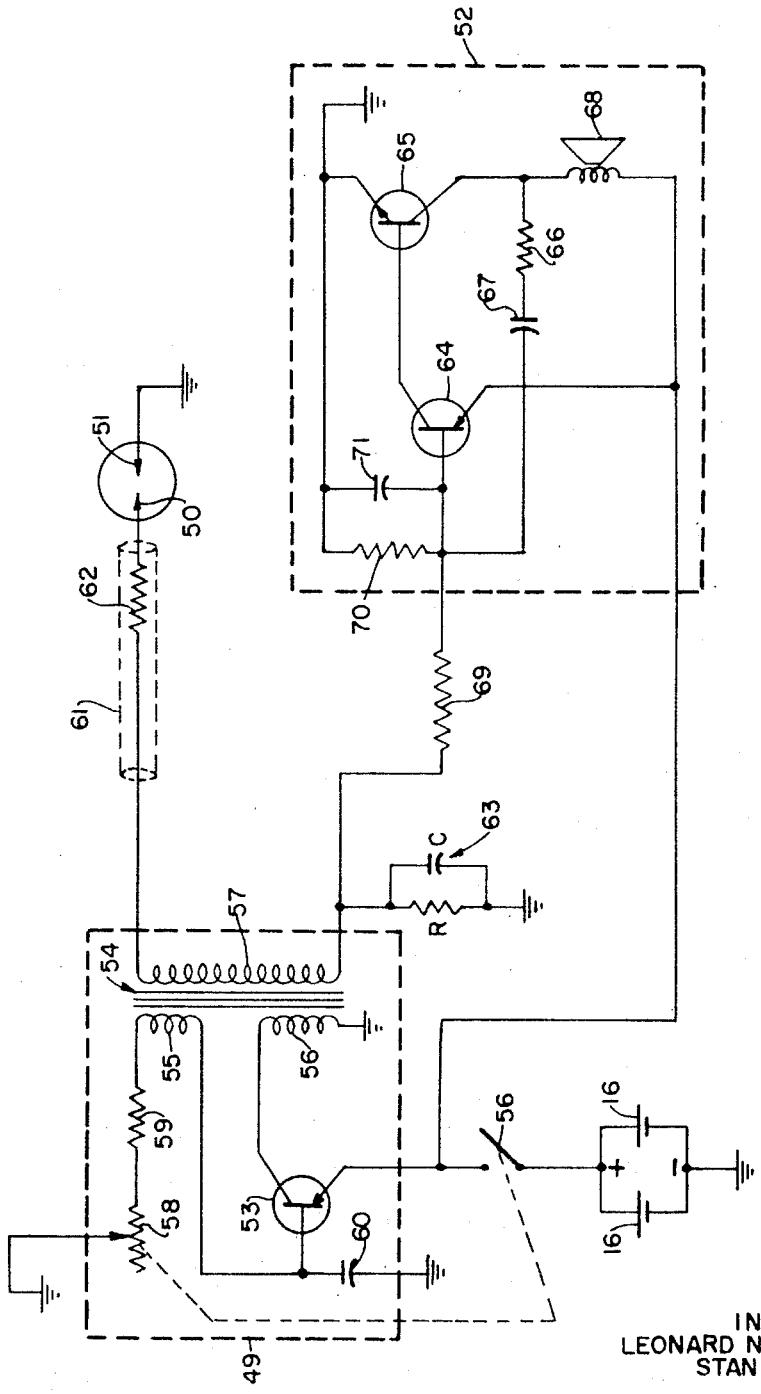
FIG. 7 is a circuit diagram of another embodiment of the invention.

With reference to the figures, wherein like characters denote like parts throughout, a leak detector 10 comprises a hollow casing 12 with a cover 14 enclosing electric batteries 16, an induction coil 18, a speaker 20, a transistor 22, and a probe 24.

The casing 12 may be provided with partitions 13 and 15 to separate the batteries 16 from the other parts and from each other. Strap and lead connectors are provided interiorly of the casing to establish the circuit shown in FIG. 6. The end of the casing 12 from which the probe 24 extends, and the partition 13, are apertured and provided with bushings 26 and 28, respectively, constructed to slidingly receive the probe 24. These bushings may be of rubber or other resilient material and are of sufficient diameter to receive the telescopic probe and still provide some friction preventing easy movement of the probe therethrough.

The probe 24, as shown in FIG. 5, comprises a metallic tubular casing or sheath 30 surmounted by an adjustable apertured metallic cap 32. Since the outer end of the probe is externally threaded and the cap is internally threaded to match, as indicated at 33, the cap 32 may be adjusted longitudinally to closely regulate the electrode separation, as will be more fully explained. Marking indicia (not shown) may be provided for indicating exactly the position of the cap 32 with respect to the outer end of the probe sheath 30. The cap 32 is further provided with radial and longitudinal apertures 34 for the reception of halogen vapor.

Internally of the outer end of the probe casing 30, an insulating disc 35 is disposed to mount an electrode support 36, which may be formed of any electrically conductive material, such as copper or silver. A fine wire electrode 37 extends longitudinally outward from its support 36. The electrode 37 may be of platinum or other durable metal which will not react with the atmosphere to be tested. Its length is sufficient to reach fairly closely to the underside of the transverse portion of the cap 32. The actual distance between the two may then be closely regulated by adjusting the cap inwardly or outwardly as desired. Alternatively, the electrode constituted by the metallic cap 32 may have a small tab (similar to that forming the negative electrode of an automotive spark plug) bent inwardly from the end surface of the cap 32 and extending toward the other electrode 37. The internal volume of the electrode housing (i.e. that part of the interior of the probe between the cap 32 and the disc 35) is preferably made relatively small, so that a minimum amount of air mixes with the impurity vapor to be detected as the probe is moved through the atmosphere in which a leak is suspected, thereby rendering the device highly sensitive. For example, the electrode housing may be ⅛ inch long and ⅛ inch in diameter.

The electrode support 36 is connected by an insulated lead wire 38 to one terminal of a resistor 31, connected in parallel with a loudspeaker 20. A lead 40 is electrically connected to the casing 30, while a lead 41 is connected to the other side of the resistor 39. Leads 40 and 41 are connected to a secondary winding 45 (FIG. 6) of the transformer (or induction coil) 42.

The circuit of the embodiment of FIGS. 1 through 3, shown in FIG. 6, includes a blocking oscillator 46 powered by batteries 16. The blocking oscillator 46 includes a transformer 42, having three mutually coupled windings 45, 47 and 48, as well as a transistor 22 and a parallel R-C circuit 23, including a variable resistor 23a and a capacitor 23b, connected in series with the base of transistor 22. A mechanical or other type of interrupter may alternatively be used in place of transistor 22, but the latter is preferred because of its simplicity and lower weight and volume. The transformer winding 45 is connected in series with the coil of speaker 20, via lead 41, and to the electrodes 32 and 37 by means of leads 40 and 38, respectively. Power is furnished by series connected batteries 16 through a switch 43.

A resistor 39 in parallel with the speaker 20 is provided to prevent undesirable voltage peaks from damaging the speaker.

In operation, the probe 24 is pulled out from the casing 12 and the switch 43 is closed. This turns on the blocking oscillator 46, which oscillates at a frequency determined by the parameters of the transformer 42, the values of resistance and capacitance of the R-C circuit 23, the voltage of the batteries 16, and the characteristics of the transistor 22. The operation of the blocking oscillator is well known and is explained, for example, in "Transistor Circuit Engineering," by R. F. Shea, pp. 260–261, (Wiley, 1957).

The output of the blocking oscillator 46 appears across the winding 45, and causes a current to flow in the loop containing the speaker 20 and the electrodes 32, 37, thereby establishing a low intensity spark discharge between the electrodes. The current flow corresponding to the spark discharge produces a plainly audible sound from the speaker.

The blocking oscillator output waveform $v_e$, applied across the electrodes 32 and 37, is shown in FIG. 8a. The high voltage pulse is negative with respect to ground. As indicated, the peak electrode potential in the absence of sparking $V_p$, which is equal to the voltage supplied in the embodiment of FIG. 7, for example, across secondary winding 57 (which may be varied by changing the electrode spacing, as described above) is set slightly higher than the dielectric breakdown potential $V_b$ of the particular gas (normally air) in which impurities are to be detected. A low intensity spark discharge is thereby produced by each rise in the voltage $v_e$ above $V_b$, and is extinguished between successive pulses. Introduction into the given atmosphere of a minute quantity of halogen gas raises the dielectric breakdown potential of the atmosphere from $V_b$ to $V_b'$, above the peak electrode voltage $V_p$, so that no discharge is ignited. Before cessation of the recurring discharge (when the breakdown potential of the atmosphere goes above $V_p$) the maximum electrode voltage is always equal to the instantaneous value of the dielectric breakdown potential of the atmosphere, as is clear from FIGS. 8a–8d. Upon cessation of the periodic discharge the current through the coil of loudspeaker 20 drops virtually to zero, and the sound produced by it ceases, indicating the presence of the impurity. For example, in a pure air atmosphere characterized by a dielectric breakdown potential $V_b=2500$ volts, where the peak pulse voltage $V_p=2550$ volts, the introduction of 5 p.p.m. $CCl_3F$ vapor (by volume) into the spark discharge causes cessation of the discharge, signaling the presence of the vapor.

If the batteries 16 have deteriorated somewhat, it is necessary to screw the cap 32 inwardly, thus shortening the distance between the electrodes. One reason for the increased sensitivity of this device in comparison with those formerly known is the construction of the probe 30, which allows the spark discharge to be placed in close proximity to any leak. Prior devices generally mixed relatively large volumes of air with the impurity gas in exploring tubes, making the impurity gas harder to detect. Further, because the insulator 35 inhibits gross currents of air (and other ambients) along the axis of the electrode 37, the sensitivity of the device is substantially improved. In addition, the sensitivity of the device is enhanced by making the electrode housing of metal rather than glass, or other non-conducting material, as has been previously suggested.

The embodiment of FIG. 4 substitutes a high voltage transformer for the batteries and transistor blocking oscillator of the circuit of FIG. 6. While much simpler in construction, this embodiment requires connection to an external source of A.C. power of proper voltage. The embodiment of FIGS. 1–3 is of course more widely applicable than that of FIG. 4, because the former is portable.

The embodiment of FIG. 7, unlike that of FIG. 6, causes an audible signal to be produced in the presence of impurities rather than causing a sound to cease. This embodiment comprises broadly a pair of electrodes, means for periodically igniting and extinguishing a low intensity spark discharge across the electrodes, and means responsive to cessation of the spark discharge for generating a signal, in particular an audible signal, to indicate the presence of impurities. A blocking oscillator 49 produces an output voltage which is applied across a pair of electrodes 50 and 51. A capacitor connected in series with the pair of electrodes is charged to a D.C. level when a spark discharge occurs, which D.C. level is used to control an oscillator 52 which drives a loudspeaker. The D.C. level biases the oscillator 52 off, so that when the spark discharge ceases, in the presence of a gaseous impurity, the oscillator is turned on and the loudspeaker signals the presence of the impurity.

The blocking oscillator 49 includes a transistor 53 and a transformer 54 having three windings 55, 56 and 57. D.C. current is supplied by batteries 16 through variable resistor 58, fixed resistor 59, winding 55 and a switch 56 to the emitter-base junction, which is shunted by a capacitor 60 and thus the output voltage of the blocking oscillator 49 may be controlled by adjusting variable resistor 58. This makes it unnecessary to use a probe with adjustable electrode spacing, allowing the use of less expensive fixed electrodes.

The output voltage of blocking oscillator 49, which appears across the transformer winding 57, is applied through a cable 61 and limiting resistor 62 (about 50 KΩ) across the electrodes 50 and 51 and is returned to the transformer winding 57 through an R-C circuit 63. The transformer is connected so that the negative going pulses appear at the more pointed electrode 50. The time constant of the R-C circuit 63 should be long with respect to the period of the blocking oscillator output waveform. The blocking oscillator has a low duty cycle, which results in the output waveform having a high amplitude negative going pulse and a low amplitude positive going pulse. In addition, the very short negative pulse (about 1 millisecond) results in a low average power dissipation in the discharge, so that the electrode temperature is kept low as is desirable for reasons previously stated.

The spark discharge occurring periodically between the electrodes 50 and 51 rectifies the applied voltage pulses by conducting only on the negative pulses, so that a net D.C. current flows between the electrodes. This creates a constant positive D.C. signal voltage across the R-C circuit 63 as long as the spark discharge periodically appears. The disappearance of this signal voltage, corresponding to the cessation of the periodic discharge, is utilized to signal the presence of halogens or other impurities.

The signal source for signaling the presence of halogens comprises a conventional oscillator 52 containing transistors 64 and 65 of opposite types connected by a positive feedback loop containing resistor 66 and capacitor 67. The oscillator is connected to drive a speaker 68 at an audible frequency (e.g. 1 kc.). The existence, however, of a positive D.C. signal voltage across the R-C circuit 63 drive the transistor 64 into cutoff, thereby preventing operation of the oscillator 52. The D.C. voltage across the R-C circuit 63 is applied to the base of the transistor 64 through a resistor 69 which is relatively large in comparison with the resistor R in the R-C circuit 63, so that the capacitor C discharges primarily through resistor R rather than resistor 69. The resistor 70 and capacitor 71 connected between the base of transistor 64 and ground act as a voltage divider in conjunction with the resistor 66 and capacitor 67 of the positive feedback path.

The voltage $v_e$ across the electrodes 50 and 51 is shown in FIG. 8a. The peak voltage in the absence of sparking $V_p$ across the electrodes 50 and 51 (adjustable by varying the value of resistor 58) is made slightly higher than the dielectric breakdown potential $V_b$ of the atmosphere in which impurities are to be detected and in which the periodic spark discharge is ignited, as explained above. The presence of halogen gas in that atmosphere raises its dielectric breakdown potential above $V_p$ to $V_b'$, thereby causing cessation of the periodic discharge and permitting the D.C. signal voltage across the R-C circuit 63 to discharge through the resistor R. This immediately renders the oscillator 52 operative to generate an audible signal in the speaker 68, signaling the presence of the gaseous impurity.

Thus far only the detection of gases having dielectric breakdown potentials higher than that of the given atmosphere (air, in the case of most leak detectors) has been discussed. Certain gases, including some halogens, have breakdown potentials lower than that of the given atmosphere; therefore their presence lowers the breakdown potential $V_b$ of the mixture. To detect such gases, any of the embodiments described above may be adjusted so that the peak electrode voltage $V_p$ is slightly less than the breakdown potential $V_b$ of the given atmosphere, as shown in FIG. 8b. A periodic spark discharge will then be *initiated*, rather than suppressed, in the presence of an impurity, as the breakdown potential of the mixture decreases beyond $V_p$ to $V_b'$. In the embodiment of FIG. 6, this will cause the speaker 20 to signal the presence of the impurity. In the embodiment of FIG. 7, it will turn off the oscillator 52, thus causing the sound previously emitted by the speaker 68 to cease. Alternatively a logical negation (or complement) circuit may be connected between the R-C circuit 63 and the base of the transistor 64 to start, rather than stop, the oscillator 52 in the presence of an impurity. After initiation of the discharge, the maximum electrode voltage is always equal to the dielectric breakdown potential of the atmosphere.

In order to detect gases which either raise or lower the breakdown potential of the given atmosphere, or ambient, it is feasible to operate two units of any of the above-described embodiments simultaneously, one adjusted to detect impurities having breakdown potentials higher than $V_b$, the other adjusted to detect impurities having breakdown potentials lower than $V_b$. The particular type of gaseous impurity detected may be distinguished by making the oscillators 52 of the two units operate at audibly different frequencies or, if the embodiment of FIG. 6 is used, by making the blocking oscillators 46 operate at audibly different frequencies, or by other suitable indicating means.

Instead of using two complete units, FIG. 9 shows an embodiment of the invention capable of detecting both types of gaseous impurity. This embodiment comprises a pair of electrodes, a voltage source for alternately applying to the electrodes voltage pulses of a first amplitude slightly greater than the dielectric breakdown potential of the given atmosphere and voltage pulses of a second amplitude slightly less than the dielectric breakdown potential of the given atmosphere, and a detector for detecting (1) the failure of the first amplitude pulses to ignite a spark discharge, and (2) the ignition of a spark discharge by the second amplitude pulses.

Pulses of positive and negative polarities and different amplitudes are produced by the voltage source 72, which pulses are rectified by the time multiplex circuit 73, which includes a diode bridge, and are applied to the pair of electrodes 74. The positive and negative voltage pulses are applied across detectors 75 and 76 in independent arms of the diode bridge, which detectors are responsive to spark discharges initiated by the respective pulses applied across them.

More particularly, the pair of electrodes 74 is connected in series with the output winding 77 of a transformer 78, through the time multiplex circuit 73. The input to the transformer 78 is provided by two monostable blocking oscillators 79 and 80, the outputs of which are applied to respective windings 81 and 82 of the transformer 78 such that they induce voltages of opposite polarity in the output winding 77 of the transformer.

Because the peak amplitudes $V_{p1}$ and $V_{p2}$ of the positive and negative pulses in FIG. 8c are different, and because the positive and negative pulses are rectified and applied to the electrodes 74 through independent paths each containing a different detector 75, 76, the situation is not unlike two separate voltage sources and two separate corresponding detectors operating alternately, each with pulses of a different amplitude, but optimally synchronized together. By making $|V_{p1}|>V_b$ and $|V_{p2}|<V_b$, the detector 75 (corresponding to $V_{p1}$) detects impurities which raise the breakdown potential $V_b$ of the given atmosphere and the detector 76 (corresponding to $V_{p2}$) detects impurities which lower the breagdown potential $V_b$ of the given atmosphere. The time constants of the detectors 75 and 76 (essentially $R_1C_1$ and $R_2C_2$) should be longer than several periods of the waveform $e_0$ of FIG. 8c. Contacts operated by the relay coils $S_1$ and $S_2$ may be used to actuate alarm signals to indicate the presence of one or the other type of impurity.

Alternatively, a voltage source similar to voltage source 72 but providing an essentially unipolar output waveform could be connected in the embodiment of FIG. 6 in place of the voltage source 49, to produce alternate pulses of different amplitudes $V_1>V_b$ and $V_2<V_b$. In the given atmosphere, each pulse of amplitude $V_1$ would initiate a spark discharge, and no discharge would be initiated by the pulses $V_2$. If the breakdown potential of the atmosphere is lowered, spark discharges will be initiated by both pulses $V_1$ and $V_2$; if it is raised, neither pulses $V_1$ nor $V_2$ will initiate discharge. Thus the capactior C in FIG. 7 will charge to different voltages, depending on the gaseous impurity present, which voltages may be sensed and caused to actuate alarm signals.

It has been found, with respect to the pair of electrodes supporting the spark discharge, that if at least one electrode consists essentially of zirconium, the electrodes do not foul and cause the device to misfire, as has been found to happen with virtually all other electrode materials. It is not necessary that the zirconium used be absolutely pure; commercially pure grades have proven satisfactory. If only one electrode, rather than both, are zirconium, it should be the more sharply pointed one, which in the above described embodiments is the negative electrode.

Throughout the specification it has been stated that the peak electrode voltage "differs slightly" from or is slightly higher or lower than the breakdown potential $V_b$ of the given atmosphere. This difference must be sufficient in magnitude to prevent spurious indications by the device (through voltage fluctuations caused by external capacitances, temperature and pressure fluctuations, etc.) and yet small enough to assure good sensitivity. The smaller this difference can be made, the higher the sensitivity of the device. Voltage differences on the order of 100 volts have been found satisfactory. The shape of the electrode voltage waveform is not critical, except that the voltage must be low enough between pulses to extinguish the discharge. Narrow, low frequency pulses with low duty cycle are preferable, causing less battery drain and electrode wear. It has been stated throughout the specification that the pulses applied to the electrodes are "periodic"; however it is not meant to imply that strict periodicity is required. If other voltage sources are used, equivalent to those shown, they may be such that the intervals between pulses are not constant.

We claim:

1. The method of detecting the presence of trace amounts of gaseous impurities in a given atmosphere, comprising:
   (a) periodically applying voltage pulses across a pair of electrodes in said given atmosphere, said voltage pulses having amplitudes different from the dielectric breakdown potential of said given atmosphere by an amount (1) great enough to prevent spurious indications of the presence of such gaseous impurities, and (2) smaller than the change in the dielectric breakdown potential of said given atmosphere due to trace amounts therein of such gaseous impurities; and
   (b) detecting changes in the dielectric breakdown potential of said given atmosphere caused by the presence of such gaseous impurities, which changes are indicated by the initiation or cessation of a periodic low intensity spark discharge corresponding to the application of the periodic voltage pulses.

2. The method of detecting the presence in a given atmosphere of gaseous impurities which raise the dielectric breakdown potential of such given atmosphere, comprising:
   (a) periodically igniting and extinguishing a low intensity spark discharge in said atmosphere, and
   (b) detecting cessation of said periodic spark discharge due to an increase in the dielectric breakdown potential of said atmosphere caused by the presence of such gaseous impurities.

3. The method defined in claim 2 wherein the periodic spark discharge is produced by periodically applying a voltage across a pair of electrodes disposed in said given atmosphere, which voltage is greater in amplitude than the dielectric breakdown potential of said atmosphere.

4. The method defined in claim 3 wherein cessation of said periodic discharge is indicated by initiation or cessation of a sound signal.

5. The method defined in claim 1 wherein initiation or cessation of said periodic spark discharge is detected by monitoring the direct current component of said discharge.

6. Apparatus for detecting the presence in a given atmosphere of minute quantities of gaseous impurities having dielectric breakdown potentials different from that of said given atmosphere, comprising:
   a pair of electrodes;
   igniting means connected in circuit with said pair of electrodes for periodically applying across said electrodes voltage pulses which differ in amplitude from the dielectric breakdown potential of said given atmosphere by a voltage difference (a) great enough to prevent spurious indications by the apparatus, and (b) smaller than the change in the dielectric breakdown potential of said given atmosphere due to trace amounts therein of such gaseous impurities, said igniting means limiting current flow through said electrodes to a low intensity spark discharge; and
   detecting means for detecting the presence of a low intensity spark discharge across said pair of electrodes (electrode pair) whereby changes in the dielectric breakdown potential of said given atmosphere due to the presence of such gaseous impurities are detected by the failure to ignite, or by the ignition of such spark discharge.

7. Apparatus as defined in claim 6 wherein at least one electrode of said electrode pair is sharply pointed.

8. Apparatus as defined in claim 6 wherein said sharply pointed electrode consists essentially of zirconium.

9. Apparatus for detecting the presence in a given atmosphere of gaseous impurities which raise the dielectric breakdown potential of such given atmosphere, comprising:
   a pair of electrodes;
   igniting means for periodically igniting and extinguishing a low intensity spark discharge between the pair of electrodes; and
   detecting means for detecting the cessation of said periodic discharge when the dielectric breakdown potential of said atmosphere increases due to the presence of such gaseous impurities.

10. Apparatus as defined in claim 9 wherein said igniting means is a voltage source for periodically applying across said pair of electrodes voltage pulses of an amplitude greater than the dielectric breakdown potential of said given atmosphere.

11. Apparatus as defined in claim 10 wherein the given atmosphere is air, and the amplitude of said voltage pulses is greater than the dielectric potential of said given atmosphere by about 100 volts.

12. Apparatus as defined in claim 10 wherein said detecting means includes a signal source actuatable by the current through said pair of electrodes.

13. Apparatus as defined in claim 10 wherein said detecting means includes a signal source actuatable by the cessation of said spark discharge.

14. Apparatus as defined in claim 13 wherein said detecting means includes a filter for filtering out the D.C. component of the current flowing through said electrode pair, and said signal source is an oscillator driving an electrosonic transducer and responsive to the disappearance of said D.C. component for actuating the electrosonic transducer.

15. Apparatus as defined in claim 9 wherein said pair of electrodes includes at least one electrode composed essentially of zirconium.

16. Apparatus as defined in claim 15 wherein said one electrode of said pair of electrodes is sharply pointed.

17. Apparatus capable of detecting the presence in a given atmosphere of minute quantities of gaseous impurities having dielectric breakdown potentials lower than that of said given atmosphere, comprising:
   a pair of electrodes;
   igniting means connected in circuit with said pair of electrodes for periodically applying across said electrodes voltage pulses having amplitudes lower than the dielectric breakdown potential of said given atmosphere by an amount (a) great enough to prevent spurious indications by the device, and (b) smaller than the change in the dielectric breakdown potential of said given atmosphere due to trace amounts therein of such gaseous impurities, said igniting means limiting current flow through said electrodes to a low intensity spark discharge; and
   detecting means for detecting a low intensity spark discharge across said electrodes when the dielectric breakdown potential of said atmosphere decreases due to the presence therein of such gaseous impurities.

18. Apparatus as defined in claim 17 wherein said given atmosphere is air, and the amplitude of said voltage pulses is less than the dielectric breakdown potential of said given atmosphere by about 100 volts.

19. Apparatus for detecting the presence in a given atmosphere of gaseous impurities which either raise or lower the dielectric breakdown potential of such given atmosphere, comprising:
   a pair of electrodes;
   a voltage source for alternatively and periodically applying across said pair of electrodes (1) voltage pulses of a first amplitude greater than the dielectric breakdown potential of said given atmosphere, and (2) voltage pulses of a second amplitude less than the dielectric breakdown potential of said given atmosphere; and
   detecting means for detecting (1) the failure of said pulses of a first amplitude to ignite a low intensity spark discharge across said pair of electrodes, and (2) the ignition of a low intensity spark discharge across said pair of electrodes by said pulses of a second amplitude.

20. Apparatus as defined in claim 19 wherein said voltage pulses of a first amplitude and said voltage pulses of a second amplitude are of opposite sign, and said detecting means includes:
   a diode bridge circuit, across one diagonal of which is applied the voltage produced by said voltage source and across the other diagonal of which is connected said electrode pair, the diode bridge circuit thereby defining first and second independent paths for the first and second amplitude voltage pulses;
   a detector disposed in each of said first and second independent paths for detecting the flow of current therein due to a spark discharge across the electrode pair produced by a voltage pulse applied via that path.

21. A vapor leak detector comprising, in combination:
   a pair of closely spaced electrodes adopted to be placed in close proximity to said vapor leak;
   means for periodically igniting and extinguishing a low intensity spark discharge across the space separating said electrodes whereby when said pair of electrodes encounter a minute quality of leaking vapor said discharge ceases, said pair of electrodes consisting of a relatively long small diameter metal tube surmounted by an adjustable metallic cap containing a plurality of apertures for the reception of leaking vapor, said tube and cap forming one of said electrodes;
   an insulating bushing positioned in the outer end of said tube under said cap;
   a thin wire electrode axially mounted longitudinally of said tube and bushing and positioned in close proximity to the inner transverse surface of said adjustable cap, said adjustable cap constituting means to adjust the spacing between the tubular electrode and said thin wire electrode, and connection means for connecting said electrodes to said means for producing a low intensity spark discharge.

22. The method of detecting the presence of trace amounts of gaseous impurities in a given atmosphere, comprising:
   (a) periodically applying voltage pulses across a pair of electrodes disposed in said given atmosphere to initiate and extinguish a low intensity spark discharge therein between said electrodes; and
   (b) detecting changes in said low intensity spark discharge indicative of the presence of such gaseous impurities in the given atmosphere.

References Cited
UNITED STATES PATENTS

| 1,070,556 | 8/1913 | Strong. | |
| 2,640,870 | 6/1953 | Seitz | 324—33 |
| 2,783,647 | 3/1957 | Stuart | 324—33 |

JOHN W. CALDWELL, Primary Examiner

DANIEL K. MYER, Assistant Examiner

U.S. Cl. X.R.

73—40; 324—33; 340—237